United States Patent [19]
Gotoh et al.

[11] 4,349,006
[45] Sep. 14, 1982

[54] SUCTION MIXTURE CONTROL SYSTEM FOR VEHICLE ENGINES

[75] Inventors: Osamu Gotoh, Kurume; Yutaka Otobe, Niiza; Michio Kawamoto, Tokyo; Akira Fujimura, Niiza, all of Japan

[73] Assignee: Honda Giken Kogyo Kabushiki Kaisha, Tokyo, Japan

[21] Appl. No.: 228,223

[22] Filed: Jan. 26, 1981

[30] Foreign Application Priority Data

Feb. 2, 1980 [JP] Japan ................... 55-11762

[51] Int. Cl.³ .......................................... F02M 25/06
[52] U.S. Cl. ..................................... 123/571; 123/568
[58] Field of Search ................. 123/568, 571

[56] References Cited

U.S. PATENT DOCUMENTS

| | | |
|---|---|---|
| 3,282,261 | 11/1964 | Bartholomew . |
| 3,680,318 | 8/1972 | Nakajima et al. ............ 60/278 |
| 3,800,766 | 4/1974 | Schubeck ................... 123/568 |
| 4,257,382 | 3/1981 | Matsui et al. ............... 123/571 |

FOREIGN PATENT DOCUMENTS

| | | | |
|---|---|---|---|
| 53-17803 | 2/1978 | Japan | 123/571 |
| 54-30304 | 3/1979 | Japan | 123/571 |
| 54-36425 | 3/1979 | Japan | 123/571 |
| 54-72334 | 6/1979 | Japan | 123/571 |
| 55-54658 | 4/1980 | Japan | 123/571 |
| 2068457 | 8/1981 | United Kingdom | 123/511 |

*Primary Examiner*—Wendell E. Burns
*Attorney, Agent, or Firm*—Lyon & Lyon

[57] ABSTRACT

An internal combustion engine for a vehicle has an exhaust gas recirculating system for returning exhaust gases to the engine intake passage. The carburetion system for the engine includes a fuel enrichment valve. Sensors for various vehicle speeds and engine operating conditions operate control valves whose actions are modified by a sensor for atmospheric pressure, to control the fuel enrichment valve and a valve in the recirculation passage so that fuel enrichment and exhaust gas recirculation are both reduced when the vehicle travels at a high elevation having low atmospheric pressure.

5 Claims, 2 Drawing Figures

SUCTION MIXTURE CONTROL SYSTEM FOR VEHICLE ENGINES

This invention relates to a suction mixture control system for a vehicle engine employing exhaust gas recirculation, the vehicle operating at both low and high elevations.

Exhaust gas recirculation systems are conventionally employed in engines which operate to return part of the exhaust gas emitted from the engine to the engine intake passage via an exhaust gas recirculation passage during the operation of the engine to prevent excessive increase of the combustion temperature of the mixture in the engine cylinders. Lowering of the combustion temperature reduces the output of nitrogen oxides which are objectionable from the standpoint of atmospheric air contamination. Further, a system is also known which operates to supply the engine with a mixture having a high overall air-fuel ratio in order to reduce the concentrations of hydrocarbon, monoxide, nitrogen oxides, etc. contained in the exhaust gas. The above two systems can both be employed in engines so as to further reduce the concentration of nitrogen oxides in the exhaust gas. However, all the above-mentioned systems have to some degree an unfavorable influence upon the driveability of the vehicle, particularly the ability of the engine to operate in an optimum fashion at both low and high elevations because of the change in atmospheric pressure.

The present invention has been devised in view of the above circumstances, and it is an object of the invention to provide a system of the above-mentioned type which operates to decrease the quantity of auxiliary fuel being supplied to the engine to compensate for low atmospheric pressure, and at the same time decrease the flow rate of exhaust gas being returned to the engine intake passage.

Figure 1:
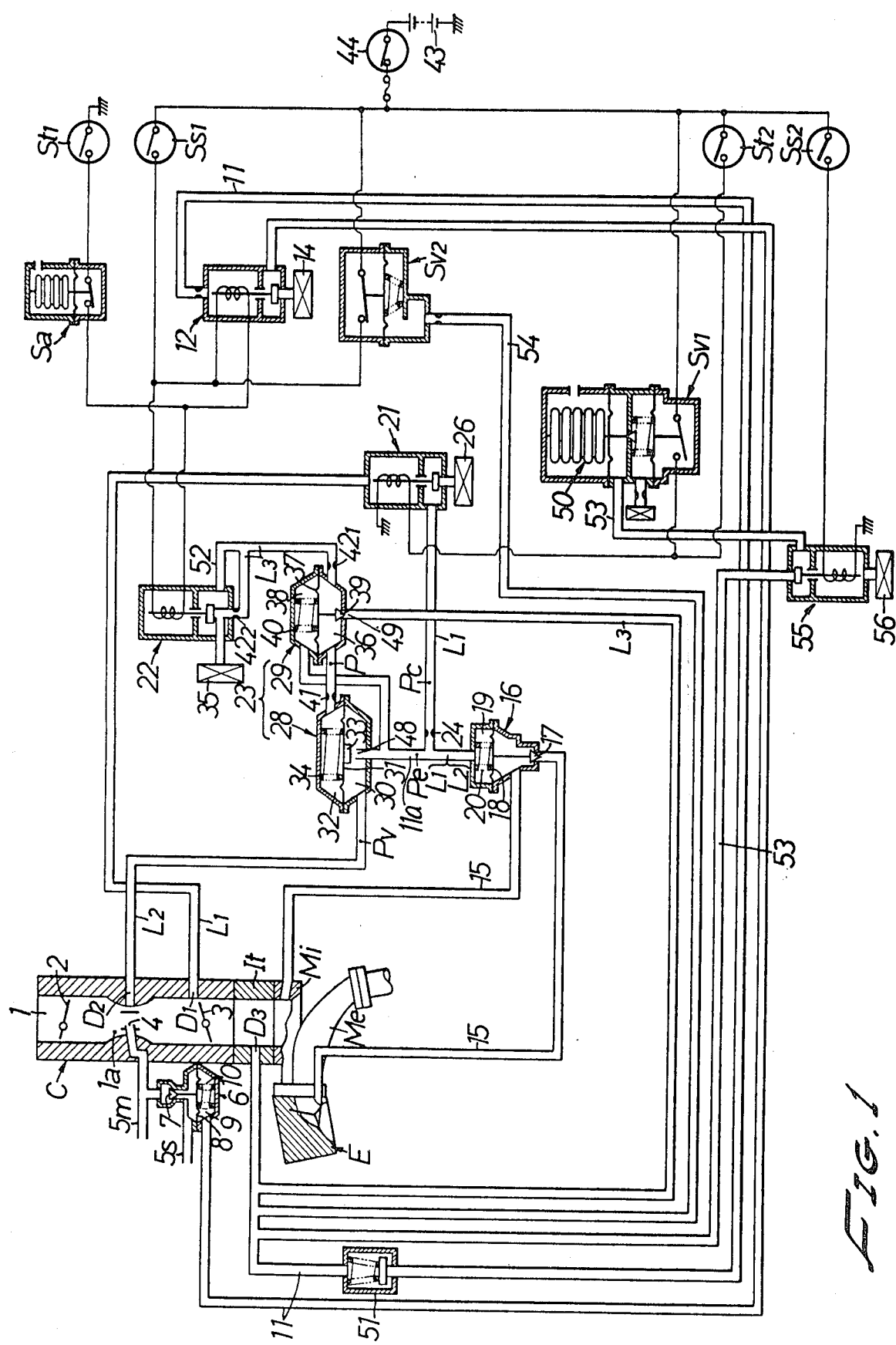
FIG. 1 is a schematic diagram, partly in section, showing a preferred embodiment of this invention.

Referring to the drawings, the automobile engine generally designated E is provided with an intake manifold Mi and an exhaust manifold Me. A carburetor C is connected to an upstream end of the intake manifold Mi through a heat insulating barrel It.

The carburetor C includes a venturi 1a provided in the intake passage 1. A choke valve 2 is positioned upstream of the venturi 1a and a throttle valve 3 is positioned downstream of the venturi 1a. A fuel nozzle 4 opens into the venturi 1a. The intake manifold Mi, the heat insulating barrel It and the carburetor C constitute the intake passage 1 of the engine E. A first suction port D1 is located in the vicinity of or downstream from the throttle valve 3, and a second suction port D2 opens into the venturi 1a. A third suction port D3 is positioned at a location downstream of the throttle valve 3.

A fuel passage leading to the fuel nozzle 4 comprises a main fuel passage 5m and an auxiliary fuel passage 5s, both of which communicate with a float chamber, not shown, in which float chamber the passages 5m and 5s open below the fuel surface level. The auxiliary fuel passage 5s is provided with a fuel supply increasing valve 6. The valve 6 includes a movable valve element 7 arranged to open or close the auxiliary fuel passage 5s. The valve 6 also includes a diaphragm 8 connected to the valve element 7, and a valve spring 10 positioned within the suction pressure chamber 9 below the valve element 7. The spring 10 urges the valve element 7 in the valve-opening direction.

The suction chamber 9 of the fuel supply increasing valve 6 communicates with the third suction port D3 via a suction passage 11 in which a solenoid valve 12 is provided. This valve 12 operates to open the suction passage 11 when its solenoid is energized, and closes the same passage 11 and simultaneously connects the downstream side of the passage 11 with an air intake port 14 provided with a filter, when the solenoid is de-energized.

Therefore, when the solenoid valve 12 is deactivated, the fuel supply increasing valve 6 operates to allow suction pressure detected by the third negative pressure detecting port D3, that is, suction pressure produced by the operation of the engine E to be introduced into the suction pressure chamber 9, so that the valve element 7 is displaced in the closing direction. Thus, as the suction pressure decreases with an increase in the engine load, the valve element 7 is correspondingly displaced in the opening direction to strengthen the fuel supply increasing function of the valve 6 for fuel supply to the fuel nozzle 4. When the engine load decreases, the fuel supply increasing function is weakened in a manner opposite to that described above. On the other hand, when the solenoid valve 12 is activated or is in an operative state, the suction pressure chamber 9 of the fuel supply increasing valve 6 has suction pressure present therein which is diluted through the air intake port 14. The valve body 7 is then displaced to its maximum opening position to cause the fuel supply increasing function to operate at the maximum extent.

A check valve 51 is provided in the suction pressure line 11, which operates when the engine E is stopped, to confine the actuating suction pressure holding the valve element 7 in its closing position, so as to avoid leakage of fuel from the fuel supply increasing valve 6.

An exhaust gas recirculation conduit 15 extends from an exhaust port of the engine E and communicates with the intake manifold Mi, with a flow rate control valve 16 provided in the conduit 15. Valve 16 includes a movable valve element 17 operated by a diaphragm 18. A valve spring 20 is positioned within the suction chamber 19 formed above the diaphragm 18 and acts to urge the valve element 17 toward closed position.

The first suction line L1 extends from the suction port D1 through the solenoid-operated air valve 21 to the suction chamber 19 of the flow rate control valve 16. An orifice 24 is located downstream of the valve 21 in the suction line L1. A second suction line L2 extends from the suction port D2 to the suction chamber 19 by way of the regulating valve 28. The air valve 21 operates to close the upstream side of its suction line L1, and simultaneously connect the downstream side with the air intake port 26 provided with a filter.

The control valve generally designated 23 includes a suction pressure responsive type regulating valve 28 arranged to open or close the second suction line L2, and also includes an air valve 29 of the suction pressure responsive type adapted to adjust the suction pressure acting upon the regulating valve 28. The regulating valve 28 includes a valve chamber 30 connected to the second suction line L2 and also includes a suction chamber 32 separated from the valve chamber 30 by the diaphragm 31. A flat movable valve element 33 fixed to the diaphragm 31 opens and closes with respect to a valve port 48 at the open end of the line 11a extending between the regulating valve 28 and the recirculation control valve 16. A valve spring 20 urges the valve element 17 toward its closed position.

The air valve 29 is comprised of a valve chamber 36 positioned in a third suction line L3 extending from the third suction port D3 and leading to an air intake port 35 provided with a filter. A suction chamber 38 is separated from the valve chamber 36 by the diaphragm 37. A movable valve element 39 secured on the diaphragm 37 is positioned to vary the opening of a valve port 49 formed at the open end of the third suction line L3. A valve spring 40 is arranged to urge the valve element 39 in its closing direction. The valve element 39 of this valve 29 has a configuration similar to that of the valve element 17 of the aforementioned flow rate control valve 16. The suction chamber 38 communicates with the first suction line L1 located downstream of the regulating valve 28, while the valve chamber 36 communicates with the pressure chamber 32 via an orifice 41. Another orifice $42_1$ is provided at a location between the valve chamber 36 and the air intake port 35. A suborifice $42_2$ has a smaller opening. A channel 52 bypasses only the suborifice $42_2$. Interposed between the bypass channel 52 and the air intake port 35 is a solenoid valve 22 which normally closes the bypass channel 52 and, when its solenoid is energized, opens the same channel.

In the present specification, the terms "upstream side" and "downstream side" of the suction lines mean "suction pressure supply source side" and "air intake port side", respectively.

When the solenoid valves 21, 22 are de-activated, the suction pressure control valve 23 operates as follows:

A suction pressure is produced in the vicinity of the throttle valve 3 or at a location downstream of same as the engine E operates, and is detected as suction pressure Pc at the first suction pressure point D1. The suction pressure Pc is transmitted to the chamber 38 of the air valve 29 via the solenoid valve 21 and the orifice 24, so that when the suction pressure Pc overcomes the setting load of the valve spring 40, it lifts the valve element 39 together with the diaphragm 37 to open the third suction pressure line L3.

When the third suction pressure line L3 is thus opened, atmospheric air is introduced into the third suction line L3 via the intake port 35, restricted in flow rate by the main orifice $42_1$ and the suborifice $42_2$, and supplied to the intake passage 1 of the engine E via the valve chamber 36 and the valve port 49, and then into the intake passage 1 of the engine E. As a consequence, suction pressure P produced in the valve chamber 36 of the air valve 29 is transmitted to the suction chamber 32 of the regulating valve 28. When the difference between the suction pressure P and the detected suction pressure Pv, at the second suction port D2, overcomes the setting load of the valve spring 34, the valve element 33 is lifted together with the diaphragm 31 to open the valve port 48. Part of the suction pressure Pv escapes through the valve port 48 to dilute or reduce the intensity of the suction pressure which has previously passed the orifice 24 into suction pressure Pe in line 11a. This suction pressure Pe serves as actuating pressure in the chamber 19 of the flow rate control valve 16.

Due to the above dilution or reduction of intensity in the suction pressure, the suction pressure present in the chamber 38 is reduced, and accordingly the opening of the air valve 29 is reduced which results in a corresponding decrease in the suction pressure in the valve chamber 36. The suction pressure in the chamber 32 of the regulating valve 28 also decreases so that the valve element 33 closes the valve port 48. Then the suction pressure Pe increases. This cycle of operation is repeated. Since this repetition occurs very quickly, the quantity of air travelling in the third suction passage L3 becomes proportional to the quantity of air being sucked into the engine E so that the suction pressure P has a value approximate to that of the suction pressure Pv.

Thus, when the quantity of air being sucked into the engine E is small, the suction pressure P is higher than the suction pressure Pv and accordingly the valve element 33 of the regulating valve 28 is displaced into its open position to decrease the actuating pressure Pe for the flow rate control valve 28. On the other hand, when the quantity of suction air increases, the suction pressure Pv increases so that the valve element 33 is displaced into its closing position to increase the actuating pressure Pe. In this manner, the air valve 29 and the flow rate control valve 16 are actuated by the same suction pressure Pe. Further, their respective valve elements 39, 17 are similar in configuration to each other. Therefore, the quantity of air flowing into the third suction pressure passage L3, that is, the quantity of air being sucked into the engine E, is proportional to the quantity of exhaust gas being returned to the suction passage so that the engine E can be supplied with exhaust gas at a permanently constant return ratio.

When the orifices $42_1$, $42_2$ provided in the control suction air line L3 have both been put into action, the flow rate of air flowing in the suction air line L3 is largely restricted, thus keeping the flow rate of recirculating exhaust gas at a low value. Therefore, if the bypass channel 52 is opened by activation of the solenoid valve 22, air which is sucked into the air intake port 35 is allowed to pass through the bypass channel 52, that is, bypassing the suborifice $42_2$ to reach the main orifice $42_1$. Thus, the flow rate of sucked air is restricted solely by the main orifice $42_1$, resulting in an increase in flow rate of recirculation exhaust gas.

On the other hand, when the solenoid valve 21 is activated to block the upstream side of the first suction pressure line L1 and simultaneously allow the downstream side of same to communicate with the air intake port 26, the actuating suction pressure Pe is replaced by atmospheric pressure which closes the flow rate control valve 16, resulting in cessation of recirculation of exhaust gas.

The control system for the above-mentioned solenoid valves 12, 21, 22 is mainly comprised of first and second vehicle speed sensing switches Ss1, Ss2, first and second engine temperature sensing switches St1, St2, and first and second vaccum pressure detecting switches Sv1, Sv2. The switches Sv1, Sv2 communicate with the third suction pressure detecting port D3, respectively, by way of suction pressure lines 53 and 54, solenoid valve 55 in the suction pressure line 53 and an atmospheric pressure sensing switch Sa. when the vehicle speed is in a low range (e.g., below 20 km/h), the switch Ss1 turns on and the switch Ss2 turns off. The switch St1 detects the temperature of engine cooling water as engine temperature and closes when the temperature exceeds a predetermined value (e.g., 75° C.). The switch St2 also senses the temperature of the cooling water of the engine and when the engine temperature exceeds a predetermined value (e.g., 60° C.), it turns off. The switch Sv1 closes when the suction pressure detected by the third suction port D3 exceeds a predetermined value (e.g., 500 mm Hg). The switch Sv2 closes when said suction pressure exceeds a relatively smaller predetermined value (e.g., 300 mm Hg). The switch Sa senses atmospheric pressure. When atmospheric pressure decreases below a predetermined value, e.g., 660 mm Hg, it turns off. The solenoid valve 55 is adapted to close the upstream side of the suction pressure line 53 and simultaneously allow the downstream side of same to communicate with the air intake port provided with a filter. When its solenoid is energized, it opens the suction pressure line 53. The first suction pressure sensing switch Sv1 is provided with bellows 50 for correcting the value of the actuating suction pressure acting upon the switch Sv1 in response to a change in the atmospheric pressure.

Figure 2:
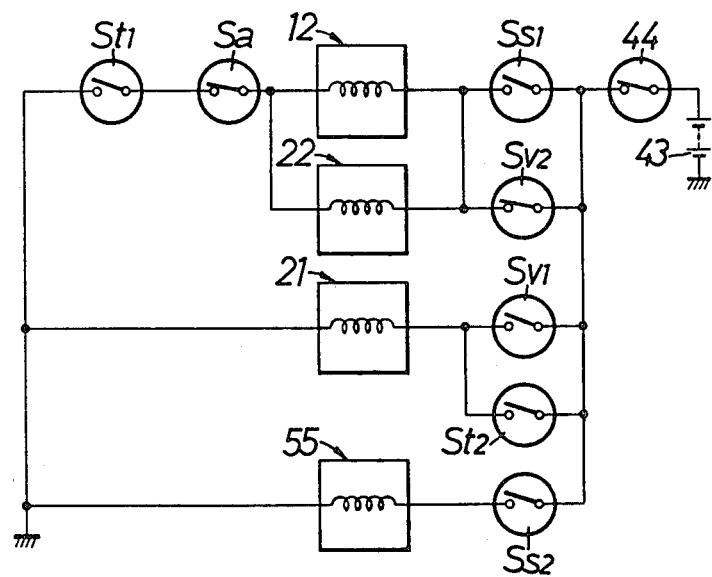
FIG. 2 is a wiring diagram.

The electrical circuit elements constituting the control system shown in FIG. 1 can be arranged as shown in FIG. 2. Interposed between the solenoid valves 12 and 22 and the power source 43 are the first vehicle speed sensing switch Ss1 and the second suction pressure sensing switch Sv2 connected in parallel with the switch Ss1, the atmospheric pressure sensing switch Sa, and the first engine temperature sensing switch St1, the switches being connected in series with each other. Interposed between the solenoid valve 21 and the power source 43 are the first suction pressure sensing switch Sv1 and the second engine temperature sensing switch St2 which are arranged in parallel with each other. Further interposed between the solenoid valve 55 and the power source 43 is the second vehicle speed sensing switch Ss2. The reference numeral 44 designates the ignition switch of the engine E.

When the engine E is started by turning on the ignition switch 44, the solenoid valves 12 and 22 are activated at the same time either when the first vehicle speed sensing switch Ss1, the atmospheric pressure sensing switch Sa, and the first engine temperature sensing switch St1 are all in the "on" position, or when the second suction pressure sensing switch Sv2, the atmospheric pressure sensing switch Sa, and the first engine temperature sensing switch St1 are all in the "on" position.

Consequently, the fuel supply increasing function of the fuel supply increasing valve 6 is carried out to the fullest extent by the action of the solenoid valve 12 and at the same time the exhaust gas recirculation ratio is increased by the action of the solenoid valve 22. That is, the condition that the above switches are in the above "on" position is satisfied when atmospheric pressure assumes a normal value, that is, the vehicle is running in a place at low altitude, the engine is in a warmed-up state (e.g., the cooling water temperature in the cylinder head is 75° C. or more), and the vehicle is running at a low speed (e.g., 20 km/h or less), or when the suction pressure drops below a predetermined value (e.g., 300 mm Hg), due to a heavy engine load such as in sudden acceleration of in running up a hill. Therefore, according to the system of this invention, when high engine power is required, such as in vehicle starting, acceleration in a low engine speed range, sudden acceleration, running up a slope, the quantity of fuel being injected from the carburetor C can be increased to satisfy the above power requirement, and also the flow rate of exhaust gas being recirculated can be increased to effectively restrain the occurrence of nitrogen oxides which would ordinarily be produced with increased engine power.

When the switches Ss1, Sv2 are both switched off, or when either the switch Sa or the switch St1 is turned off, wherein the vehicle is running at a high speed and with a light load or is running in a place at high altitude where atmospheric pressure is low, or the engine is in a cold state, the fuel supply increasing function of the fuel supply increasing valve 6 is weakened and also the flow rate of exhaust gas being recirculated is reduced.

The reason for thus weakening the fuel supply increasing function of the fuel supply increasing valve 6 during running in a high altitude location, as well as reducing the rate of recirculation of exhaust gas, lies in the fact that the mixture produced by the carburetor C is apt to be rich due to a reduced density of suction air fed into the engine caused by decreased atmospheric pressure, and that the engine power decreases due to a reduced mixture charging efficiency of the engine. This weakening of the fuel supply increasing function and reduction of the recirculation rate of exhaust gas also brings about improvement in the fuel consumption characteristic as well as obtaining required engine power during high speed and high load running of the vehicle. When the engine is operated in a cold state, weakening of the fuel supply increasing function and reduction in the exhaust gas recirculation rate reduces production of nitrogen oxides even though exhaust gas recirculation rate is reduced, since the mixture combustion temperature in the engine is then relatively low.

According to this embodiment of the invention, when the engine is operated in a cold state, the solenoid valve 21 is preferentially put into action to cause the flow rate control valve 16 to be closed to interrupt the exhaust gas recirculation. This preferential operation of solenoid valve 21 is brought about when at least one of the first suction pressure sensing switch Sv1 and the second engine temperature sensing switch St2 turn on. More specifically, this position of the switches takes place when the vehicle is put into a decelerated state (engine braking) during running at a middle or high speed, wherein the solenoid valve 55 is actuated through the vehicle speed sensing switch Ss2 which is then on, to have the suction pressure line 53, which is controlled by the first suction pressure sensing switch Sv1, kept in an open position, so that the suction pressure has increased over 500 mm Hg. Otherwise, this switch position also takes place when the engine is in a cold state, for instance, when the cooling water in the cylinder head exists at a temperature of 60° C. or less. As a result of the above activation of the solenoid valve 21, the flow rate control valve 16 releases the actuating suction pressure acting thereupon through the air intake port 26, and accordingly comes into a closed state, thus interrupting the exhaust gas recirculation.

On the other hand, simultaneously with the above operation, the solenoid valve 12 is de-activated by switching off the switch St1 when the engine is in a cold state or by switching off the switches Ss1 and Sv2 when the engine is operated with a low load, and consequently the fuel supply increasing function of the fuel supply increasing valve is weakened or stopped. This occurs when the actuating suction pressure in the suction pressure chamber 9 assumes an excessively high value. The reason for this weakening or interruption of the fuel supply increasing function lies in the fact that nitrogen oxides in the exhaust gas are produced only in small quantities during the low load operation or cold state operation of the engine, and that the occurrence of unburned gas components in the exhaust gas such as HC, CO should be restrained and also the fuel consumption should be minimized.

When the engine speed drops to a low speed range, e.g., 20 km/h or less, by the decelerating operation, the second vehicle speed sensing switch Ss2 turns off to interrupt activation of the solenoid valve 55. Then, the first suction pressure sensing switch Sv1 operates to release the actuating suction pressure acting thereupon through the air intake port 56 and accordingly turns off so that the solenoid valve 21 returns to its normal position wherein the exhaust gas recirculation can be resumed.

As set forth above, according to the present invention, various sensing switches, which are responsive to changes in the vehicle operative conditions, are arranged in activating circuits for a first solenoid valve for controlling a return exhaust gas flow rate control valve, and a second solenoid valve for controlling a fuel supply increasing valve, thus enabling concurrent control of the flow rate control valve and the fuel supply increasing valve. For instance, during acceleration of the vehicle or high load operation of the engine, recirculation of exhaust gas can also be carried out at a sufficient flow rate of exhaust gas when the fuel supply increasing function of the fuel supply increasing valve is strengthened to increase engine power. Thus, enhancement of the engine power characteristic, and reduction of air contamination can be achieved at the same time. Further, when the fuel supply increasing function of the fuel supply increasing valve is weakened, recirculation of exhaust gas is reduced to a moderate value, thereby improving the fuel consumption characteristics while avoiding a decrease in engine power.

Moreover, addition of an atmospheric pressure sensing switch connected in series with the above sensing switches enables reduction of emission of unburned gas components which would occur due to excessive concentration of the mixture produced by the carburetor because of a decrease in the air density when the vehicle is operating in a high altitude location, as well as minimizing the drop in engine power by virtue of a decreased flow rate of exhaust gas being recirculated. This assures satisfactory driveability of the vehicle.

Having fully described our invention, it is to be understood that we are not to be limited to the details herein set forth but that our invention is of the full scope of the appended claims.

We claim:

1. A suction mixture control system for an internal combustion engine for a vehicle, the engine having an intake passage with a pressure responsive auxiliary fuel supply means, and having an exhaust gas recirculation passage, the improvement comprising, in combination: a flow regulating valve in the exhaust gas recirculation passage, said regulating valve being responsive to suction pressure in the engine intake passage, a first control valve for limiting suction pressure applied from said intake passage to said regulating valve, a second control valve for operating the pressure responsive auxiliary fuel supply means, vehicle speed and engine operation sensors connected to said control valves, a switch operated by an atmospheric pressure sensor and operatively connected to said control valves, whereby said regulating valve and said auxiliary fuel supply means are controlled in a manner such that the flow rate of exhaust gas being recirculated and the quantity of auxiliary fuel being supplied to the engine are decreased when the atmospheric pressure is below a predetermined magnitude.

2. The combination set forth in claim 1 in which all of said sensors operate switches connected in series.

3. A suction mixture control system for an internal combustion engine for a vehicle, the engine having an intake passage with a pressure responsive auxiliary fuel supply means, and having a recirculation control valve provided in an exhaust gas recirculation passage which extends from an exhaust passage of the engine and leads to the intake passage, the control system comprising, in combination: the recirculation control valve being responsive to suction pressure in the intake passage, a pressure control valve means for controlling suction pressure introduced from the intake passage into the recirculation control valve, first control valve means for controlling the pressure control valve means by regulating suction pressure supplied thereto, second control valve means for controlling the auxiliary fuel supply means by regulating suction pressure supplied thereto, a switch operated by an atmospheric pressure sensor and operatively connected to said control valves, whereby said regulating valve and said auxiliary fuel supply means are controlled in a manner such that the flow rate of exhaust gas being recirculated and the quantity of auxiliary fuel being supplied to the engine are decreased when the atmospheric pressure is below a predetermined magnitude.

4. The combination set forth in claim 3 in which said switch is an electric switch, and said first control valve means and said second control valve means are electric magnetic switches.

5. The combination set forth in claim 4 in which the first switch is connected with an electric speed switch and, an electric vacuum switch, respectively, by way of an electric thermo switch.

* * * * *